United States Patent [19]

Rudak

[11] Patent Number: 5,014,329
[45] Date of Patent: May 7, 1991

[54] AUTOMATIC DETECTION AND SELECTION OF A DROP-OUT COLOR USING ZONE CALIBRATION IN CONJUNCTION WITH OPTICAL CHARACTER RECOGNITION OF PREPRINTED FORMS

[75] Inventor: Peter Rudak, Hilton, N.Y.

[73] Assignee: Eastman Kodak Company, Rochester, N.Y.

[21] Appl. No.: 557,291

[22] Filed: Jul. 24, 1990

[51] Int. Cl.⁵ .......................... G06K 9/00; H04N 1/46
[52] U.S. Cl. ......................................... 382/17; 358/78
[58] Field of Search ...................... 382/17, 61; 358/75, 358/78, 80; 250/226

[56] References Cited

U.S. PATENT DOCUMENTS

| | | | |
|---|---|---|---|
| Re. 29,104 | 1/1977 | Shepard | 382/61 |
| 4,368,482 | 1/1983 | Machida et al. | 358/29 |
| 4,454,532 | 6/1984 | Itani et al. | 358/29 |
| 4,647,961 | 3/1987 | Kammoto et al. | 358/163 |
| 4,656,665 | 4/1987 | Pennebaker | 358/163 |
| 4,873,570 | 10/1989 | Suzuki et al. | 358/80 |

*Primary Examiner*—Leo H. Boudreau
*Attorney, Agent, or Firm*—Dennis R. Arndt

[57] ABSTRACT

A method and apparatus for separating text information from previously printed material on forms by automatically detecting and selecting the drop-out color based on sampling a color from a selected calibration zone or patch. Using a three-color electronic scanner, the filtering parameters are adjusted based on the detected color in the zone of the form being processed.

7 Claims, 7 Drawing Sheets

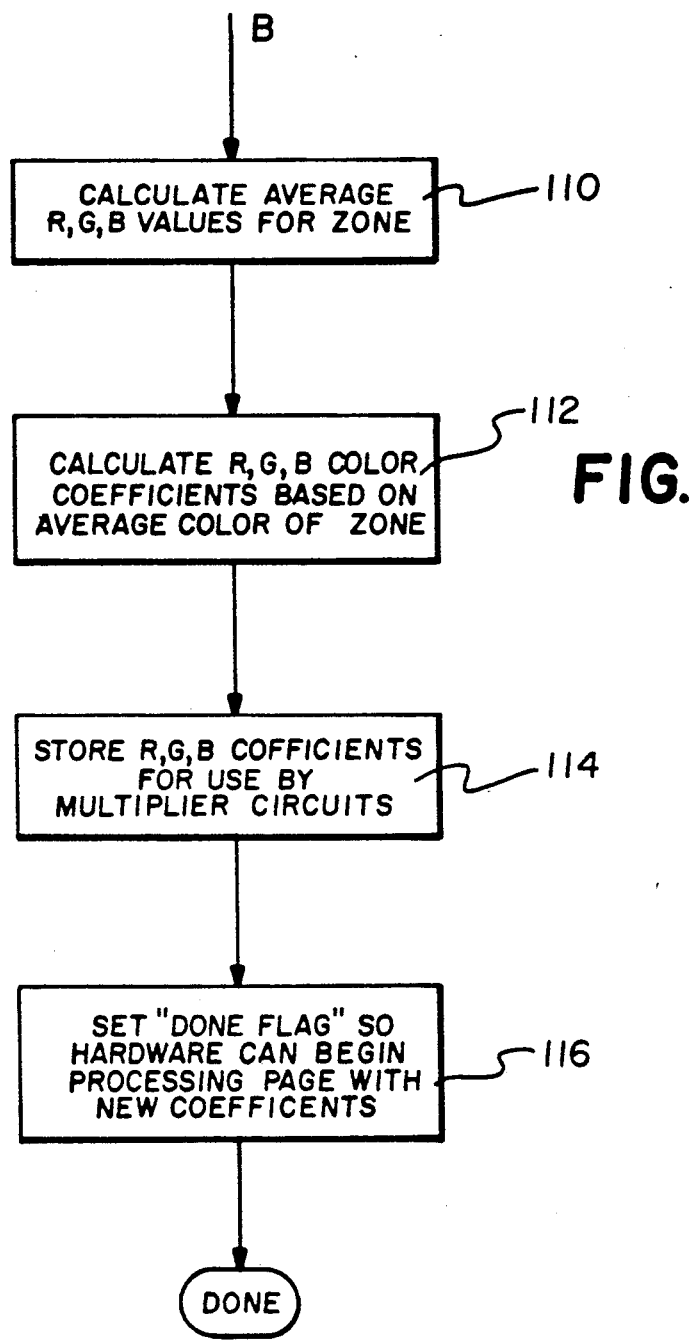

AUTOMATIC DETECTION AND SELECTION OF A DROP-OUT COLOR USING ZONE CALIBRATION IN CONJUNCTION WITH OPTICAL CHARACTER RECOGNITION OF PREPRINTED FORMS

TECHNICAL FIELD OF THE INVENTION

The invention relates to the automatic detection and selection of a drop-out color using a color electronic scanner and more particularly, allows the Optical Character Recognition (OCR) system to adjust the filtering parameters automatically based on sampling color from a section (patch) of the actual form.

CROSS REFERENCE TO RELATED APPLICATIONS

Reference is made to commonly-assigned, copending U.S. Pat. application Ser. No. 557,293, entitled AUTOMATIC DETECTION AND SELECTION OF A DROP-OUT COLOR USED IN CONJUNCTION WITH OPTICAL CHARACTER RECOGNITION OF PREPRINTED FORMS, and U.S. Pat. application Ser. No. 557,294, entitled METHOD AND APPARATUS FOR AUTOMATIC TEXT SEPARATION USING AUTOMATIC ELECTRONIC FILTERING OF MULTIPLE DROP-OUT COLORS FOR OPTICAL CHARACTER RECOGNITION OF PREPRINTED FORMS, in the name of Peter Rudak and filed concurrently herewith.

BACKGROUND OF THE INVENTION

Optical Character Recognition (OCR) is a useful technique for processing business forms. Machine reading systems can replace several data-entry operators and reduce the expense of data capture.

In general, the first step of the OCR process is electronic scanning of the document and converting all of the information to a digital bit-map. Once the image is captured in an electronic format, the information to be read is separated from the background information—boxes and guide text must be ignored and the filled-out text should be read. Once this separation is accomplished, the electronic image of the text is processed by the OCR algorithm, where the characters of interest are converted to ASCII data.

Almost all OCR systems processing business forms employ the technique of a "drop-out color". By printing documents in a predetermined color (usually a Pastel color) and employing an optical filter of the same color in the electronic scanner, the filled-out text on the document can be separated from the printed form. The color filter causes the scanner to ignore information printed in that color (to the electronic scanner, the form color appears as being equivalent to the white background of the paper). However, since the filled-out text typically is typed or printed in black (or other dark color), this information is captured by the scanner as black. Hence, the pre-printed form is converted to a white background and the filled-out text can be processed readily by an OCR algorithm.

Use of the optical filter works well in this application, but it limits the customer to a very specific color on the form (one that precisely matches the characteristics of the optical filter installed in the scanner). Additional drop-out colors can be included in the scanner by adding additional optical filters. Accordingly, the processing of a particular form would require selecting the proper optical filter and mechanically inserting it prior to processing the form.

However, slight variations in the printing process can produce variability in the actual color of the printed form, thereby reducing the "drop-out" effect. Such changes can cause noise to be added (the scanner sees the pre-printed form information as black instead of white) which may result in the OCR algorithm producing erroneous results. Alternatively, the changing of optical filters to accommodate these slight variations in printing is not practical, since this would require a large inventory of filters, each with slightly different characteristics. Therefore, at present, the only way to control this problem practically is to tightly control the printing process to insure a uniform drop-out color. As a result, OCR Form Reading systems presently in use are generally "closed loop", which means the Forms Processing Firm (such as an insurance carrier) must maintain control over the printing of the forms, because forms created by outside establishments may not read properly due to color variations.

The present invention discloses a method and apparatus for detecting a drop-out color and selecting color filter coefficients automatically in real time by sampling color from each form as it is being processed. The requirement for a separate calibration step is removed when changing a form color. Forms of any color can be processed in an intermixed fashion. However, each form must have a reserved area or section on it containing a sample of the form color.

DISCLOSURE OF THE INVENTION

In the present invention, a programmable drop-out color is generated using a color electronic scanner. The scanner separates all images into the three primary colors: red, green, and blue. In addition, a black and white rendition of the image is produced by adding the three color components. This electronic color filter is able to calculate the Red, Green, and Blue filter coefficients "on the fly". A predetermined zone on the form to be processed contains a sample of the color ink used to print the form. This zone is scanned to determine the "average color" of the particular ink and from this information the proper Red, Green, and Blue coefficients can be calculated to filter this color. Once the coefficients are determined and loaded, the form can then be processed using the optimum drop-out filter for that particular color.

The color scanning apparatus can be calibrated for true spectral balance. The Red, Green, and Blue color signals carry all the necessary information to recreate any visible color on a document. In order to achieve "spectral balance", the color scanner must reproduce all information on a document with proper color (frequency and wavelength) and proper amplitude. This balance can be adjusted by manipulating the Red, Green, and Blue gain coefficients; use of the "white calibration" method can be used to accomplish this task.

BRIEF DESCRIPTION OF THE DRAWINGS

FIG. 5A-B illustrates a flow chart that is used in conjunction with form colors.

MODES OF CARRYING OUT THE INVENTION

Figure 1:
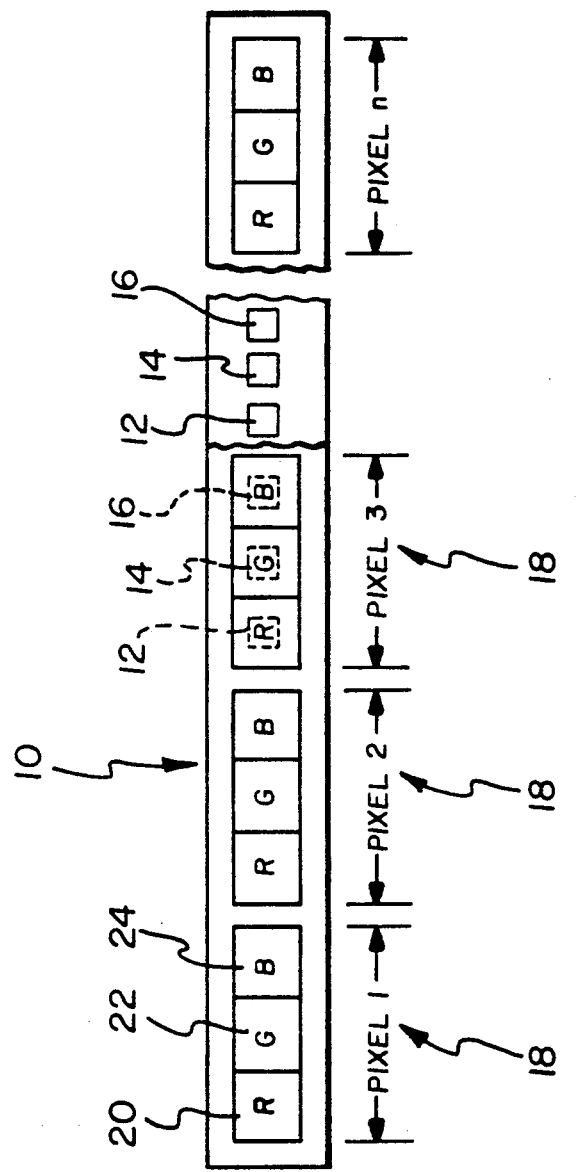
FIG. 1 illustrates the configuration of a solid state charged coupled device that can be used for color scanning.

FIG. 1 illustrates the type of electronic scanner used to generate a programmable drop-out color. This scanner would separate all images into the three primary colors: red, green, and blue. A black and white rendition of the image (as a typical electronic scanner would produce today) can be produced simply by adding the three color components. However, a color filter can be effectively "inserted" by multiplying the red, green and blue signals by varying coefficients prior to summing. This would have the tendency of biasing the output toward a certain color, hence producing the drop-out color.

The electronic scanner intended for use in the present apparatus is based on a "contact type" CCD (Charge Coupled Device) 10 currently available as Model TCD126C, made by Toshiba. The CCD is actually several CCD arrays on a single substrate and has a horizontal resolution of 1200 Pixels/inch and spans 12 inches. Because most OCR algorithms can read accurately with scan resolutions of 200 to 400 Pixels/inch, the added resolution can be used for color detection. Such detection is accomplished by masking adjacent pixels with appropriate red, green and blue optical filters with the spectral content of these filters being based on the spectral characteristics of the CCD device itself. As shown in FIG. 1, three adjacent cells 12, 14, and 16 form a single "super-pixel" 18, with cells 12, 14, and 16 being masked by red, green and blue optical filters 20, 22, and 24 respectively. If each pixel corresponds to 1/1200 inch the effective resolution of the CCD device would be 400 Pixels/inch. The output of this scanner contains a three channel output of red 26, green 28, and blue 30 video signals.

Figure 2:
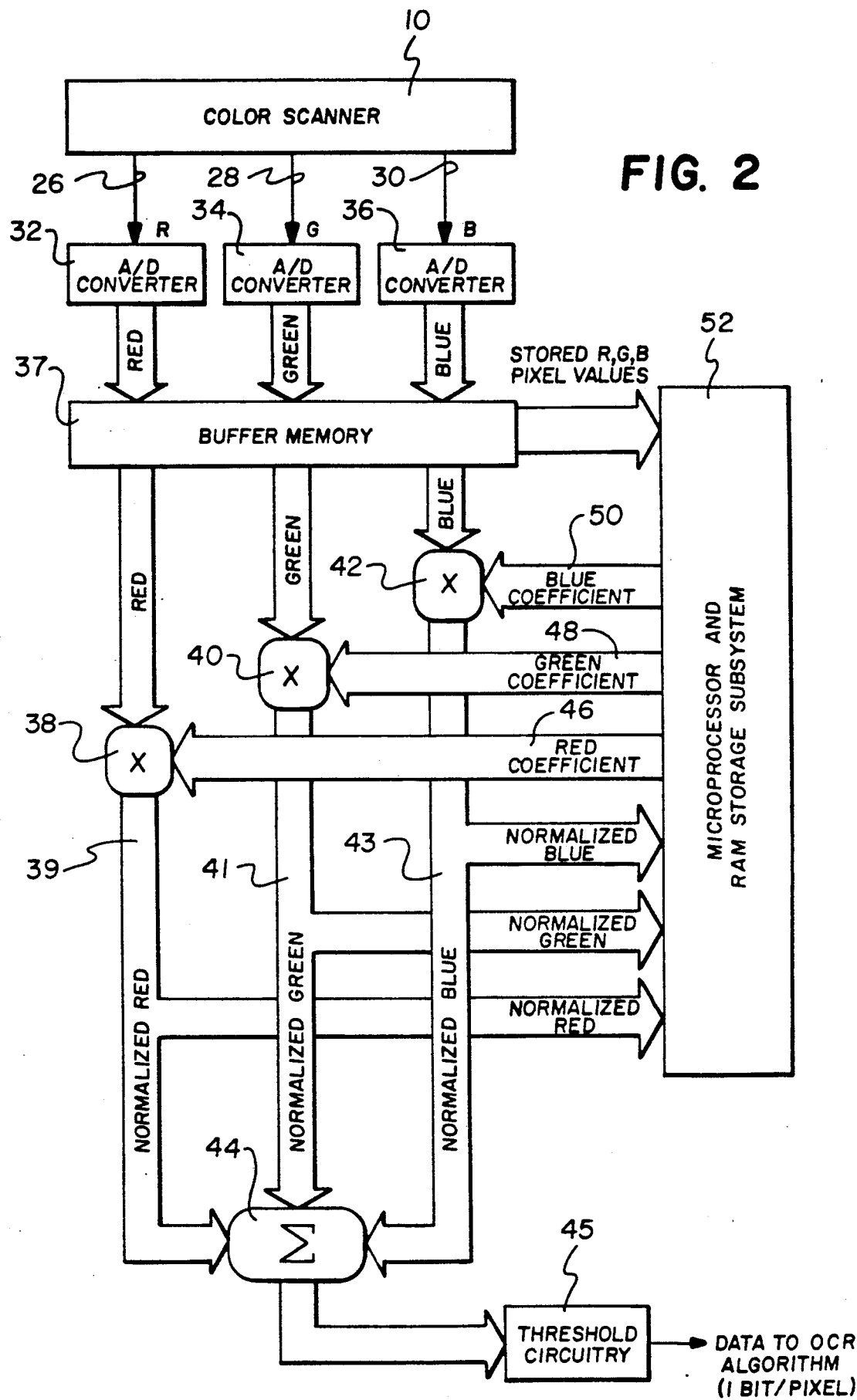
FIG. 2 illustrates a block diagram of the circuit used for electronic color filtering in accordance with the invention.

FIG. 2 illustrates a block diagram of a system implementing electronic drop-out filtering using a calibration zone. Documents are electronically scanned and captured by the color scanner 10 and three color signals red, green, and blue are generated for each pixel on respective lines 26, 28, and 30. These analog signals are digitized by respective A/D converts 32, 34, and 36 and then stored in a buffer memory 37 until the calibration zone on the particular document has been completely captured. At that time, Microprocessor and RAM Storage Subsystem 52 begins the zone calibration process to be described below. The storage of incoming pixels in the buffer memory 37 continues from the A/D converters and at the same time, Microprocessor and RAM Storage Subsystem 52 accesses the buffer 37. Once Microprocessor and RAM Storage Subsystem 52 completes the zone calibration process, a new set of red, green and blue coefficients is presented to multipliers 38, 40, and 42 for each respective color. The multipliers are next used to begin the process of reading the red, green and blue pixel values stored in the buffer memory starting at the beginning of the page and generating "normalized" color signals by multiplying the incoming digitized color signals by the calculated gain coefficients, one gain coefficient for each red 46, green 48 and blue 50 color signals. The normalized color signals 39, 41, 43 (8 bits each) are then fed to a summing circuit 44, which adds the three signals to create a grey-scale black and white signal. This grey-scale signal is converted to a binary signal (1=black, 0=white) by a threshold circuit 45. Threshold circuit 45 could be as simple as a comparator or as complicated as a full m×n two-dimensional image processor with adaptive thresholding. The binary video data can be fed to an OCR algorithm for conversion to ASCII.

Control of the three color gain coefficients are important in producing a drop-out color. Manipulation of these coefficients, creates the effects of a normal color optical filter in the output of the black and white signal from the summing circuit 44. For example, a normal red optical filter would cause attenuation of all wavelengths of light outside of the red pass band, thus causing the scanner to be "blind" to red (because red will always have a greater amplitude than all other wave-lengths, a black and white scanner will view red information as being "white"). Therefore, by selecting small gain coefficients for green and blue and a large coefficient for red, the same "blindness" to red can be created.

In addition, the electronic filter has the advantage of being programmable for any color.

As long as a calibration zone is provided on each document, the apparatus described herein can program itself for any drop-out color automatically. However, it is advisable to run White Calibration (to be discussed below) prior to zone calibration, because white calibration generates R,G,B coefficients to compensate for any non-uniformities. Microprocessor and RAM Storage Subsystem 52 can then combine the drop-out coefficients (resulting from Zone Calibration) and the coefficients resulting from the white calibration into a single set of R,G,B calibration coefficients.

Prior to processing forms using OCR, it is customary to set up or establish a "form definition" which communicates the location and characteristics of the OCR readable fields of interest to the processor. Similarly, in order to make use of the calibration zone, microprocessor and RAM Storage Subsystem 52 must be given the location of the zone on the form. This location (x offset measured in Pixels, y offset measured in lines, height measured in lines, and width measured in pixels) is used to determine the start of zone calibration and the location in memory of the pixels of interest. Zone calibration begins when the last line of the calibration zone is stored in buffer memory 37. This occurs when the number of lines stored equals the y offset plus the height of the calibration zone. The location of the calibration zone on the form in buffer memory 37 is determined as follows:

*Location of first pixel = (y offset)(line length) + (x offset)*
*Beginning of each successive line = Previous beginning point + line length*
*Location of last pixel = (y offset + height) (line length) + x offset + width*

Upon storage of the last line of the calibration, the Microprocessor and RAM Storage Subsystem 52 begins zone calibration. However, the storage of pixels into the buffer memory 37 continues at the same time. Buffer memory 37 is comprised of a dual-ported RAM and is configured as a ring buffer such that when the bottom of the memory is reached, it loops back to the top of the memory). In practice, the size of the buffer memory 37 depends on the size of the document being processed, the location of the calibration zone with respect to the top of the document and the processing speed of the zone calibration relative to the scanning speed.

Once all of the color coefficients for both white balance and drop-out color are calculated, the Microprocessor and RAM Storage Subsystem 52 stores them in RAM for real-time usage and sets a "Calibration Done" flag which allows the apparatus to begin reading buffer memory 37 and process the document.

During normal operation as mentioned earlier, and shown in FIG. 2, color scanner 10 outputs red, green and blue video signals for each pixel in a scan line. The R,G,B signals are digitized by A/D converters 32, 34 and 36, and stored in Buffer Memory 37. Because zone calibration is complete and the "Calibration Done" flag has been set, the multipliers 38, 40 and 42 start processing from the beginning of the page. Red, green and blue values are read in parallel and multiplied by the appropriate red, green and blue coefficients. The Microprocessor and RAM Storage Subsystem 52 recalls the appropriate red, green and blue coefficients for each pixel within the scan line and feeds these values to the multiplier 38, 40, and 42 in conjunction with the red, green and blue values for a given pixel. The multipliers 38, 40, and 42 create normalized red, green and blue values for each sequential pixel within a scan line. These signals are fed simultaneously to summing junction 44 and to a dual-ported RAM (not shown) within Microprocessor and RAM Storage Subsystem 52. Microprocessor and RAM Storage Subsystem 52 stores the normalized or calibrated red, green and blue pixel values for an entire scan line thereby allowing for self-diagnosis and service access to verify circuit operation. Summing junction 44 is used to calculate an "average" black and white value for each pixel. The normalized or calibrated red, green and blue components of each pixel are added together to create a grey-scale black and white data stream from each scan line (similar to a conventional black and white scanner). However, because of the color manipulation implemented by the multipliers 38, 40, and 42 and summing junction 44, the data stream is corrected for pixel to pixel variations in amplitude and color, and also simulates the effects of an optical color filter. This data stream is now fed to threshold circuit 45 where a number of algorithms can be implemented to convert the grey-scale data stream to a binary (1 bit/pixel) data stream for OCR reading.

Figure 3:
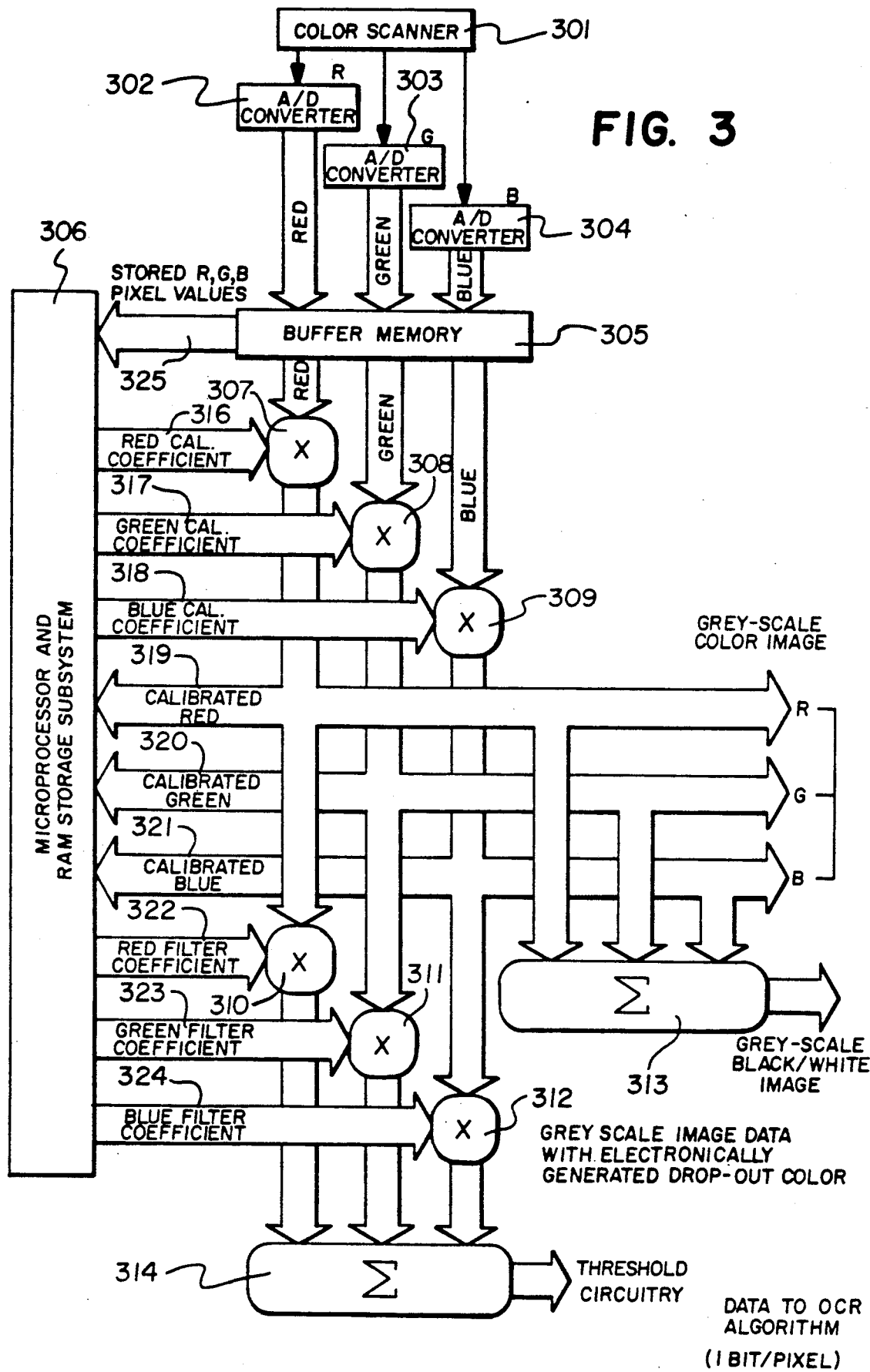
FIG. 3 illustrates an expanded block diagram of the circuit shown in FIG. 2 having grey-scale color image outputs R,G,B as well as a grey-scale black/white image output.

FIG. 3 shows a block diagram of an expanded circuit for electronic color filtering via zone calibration coupled with simultaneous full image capture (color and/or black/white). The same color scanner 301 is used with A/D converters 302, 303 and 304 for each of the three analog outputs R,G,B.

Similar to the basic system discussed in FIG. 2, this apparatus also may be calibrated for true spectral balance via White Calibration. During the White Calibration process, the Microprocessor and RAM Storage Subsystem 306 can monitor incoming video using the Calibrated Red 319, Calibrated Green 320 and Calibrated Blue 321, data ports. The Microprocessor and RAM Storage Subsystem 306 monitors the Red, Green, and Blue values 319, 320 and 321 at the outputs of multipliers 307, 308 and 309 respectively, and creates calibration coefficients for all sequential pixels within a scan line. These coefficients are stored in Microprocessor and RAM Storage Subsystem 306. Once White Calibration has been completed, the Red, Green and Blue Calibration Coefficients 316, 317 and 318 are presented to multiplier 307, 308 and 309, respectively on a pixel by pixel basis to produce a calibrated output for each color signal 319, 320 and 321.

When processing incoming documents, the grey-scale R,G,B data for each scan line is sequentially stored in Buffer Memory 305 until the calibration zone has been captured in a predetermined location. At that time, Microprocessor and RAM Storage Subsystem 306 accesses buffer memory 305 using data port 325 and runs the calibration zone algorithm used during White Calibration. Concurrently, buffer memory 305 continues storing R,G,B values for incoming scan lines as produced by color scanner 301. Once zone calibration has been completed and Microprocessor and RAM Storage Subsystem 306 has determined, the proper filter coefficients to filter the color found in the calibration zone, these filter coefficients 322, 323 and 324 are presented to respective multipliers 310, 311 and 312. At the completion of zone calibration, stored data is read from buffer memory 305 and fed to multipliers 307, 308 and 309 where each pixel's Red, Green and Blue components is multiplied by the proper Red, Green or Blue calibration coefficients 316, 317, and 318 which were determined by White Calibration. The calibrated Red, Green and Blue outputs of multipleirs 319, 320 and 32 can be used as a grey-scale color image (with spectral correction as a result of white calibration). These signals can then be fed to summing circuits 313 to create a grey-scale black and white image (this image would also have spectral correction as a result of this white calibration). This grey scale Black/White image may be processed much like the output of a standard black and white scanner.

Simultaneously, the calibrated Red, Green and Blue color signals 319, 320 and 321 for each pixel are also fed to multipliers 310, 311 and 312 where the color signals are multiplied by the filter coefficients 322, 323 and 324 that was determined by zone calibration. The output of these multipliers is summed by summing Circuit 314 on a pixel by pixel basis to form grey-scale image data with electronically generated color filters corresponding to the color formed in the calibration zone. This grey scale image then is processed via a conventional threshold circuit to create binary image data suitable for OCR reading. Thus, it can be seen that by using a single color scanner, this circuit allows for the simultaneous capture of spectrally balanced color images, as well as spectrally balanced black and white images, and filtered ("drop-out color") images for OCR reading.

WHITE CALIBRATION

White calibration can be used to optimize scanner performance by compensating for any spectral anomolies or sensitivity variations on a pixel by pixel basis. The white calibration method discussed here is the preferred method for assuring uniform response from the scanner, since the compensation can be done just prior to running, thereby also compensating for differences due to age or wear.

Figure 4A:
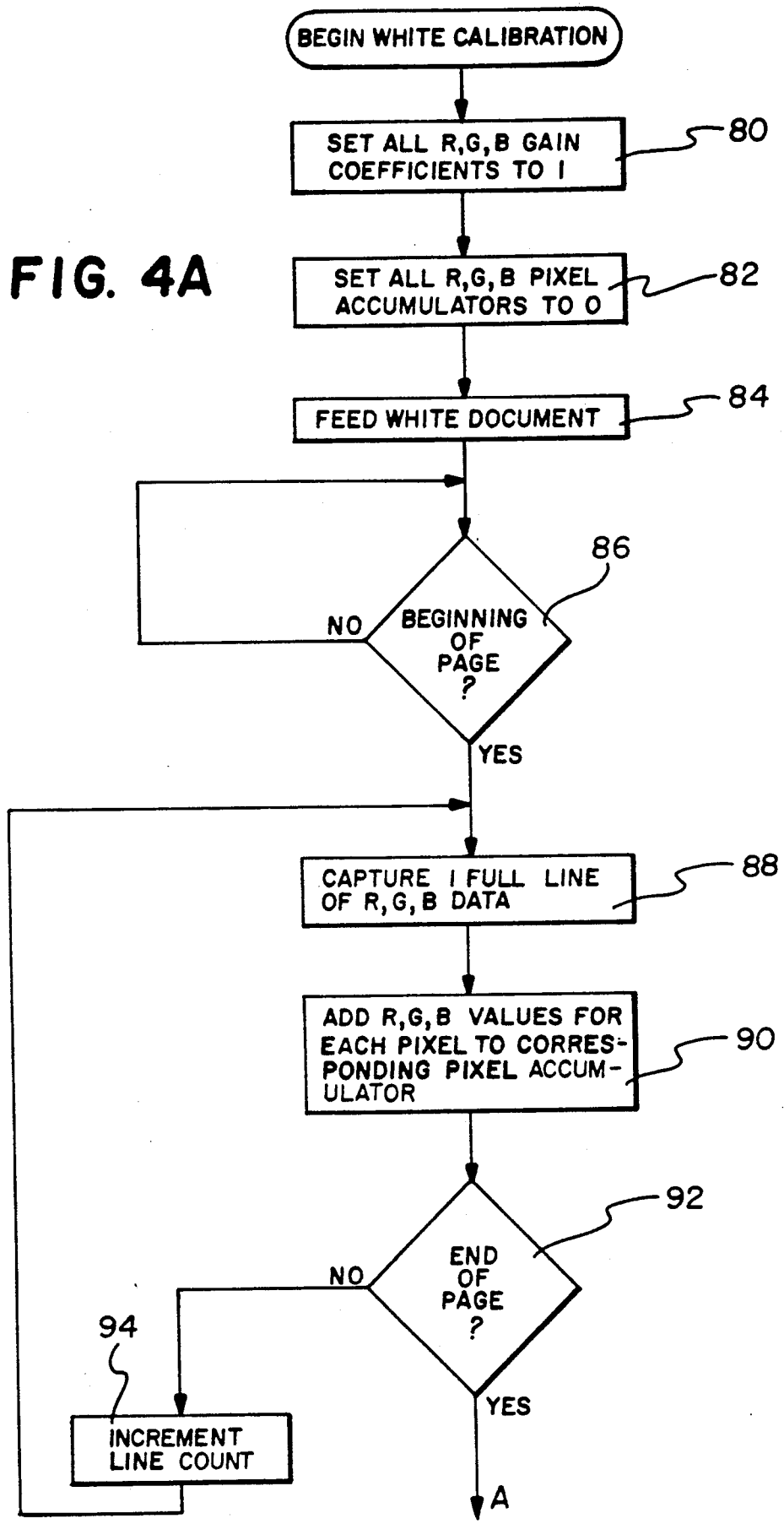
FIG. 4A-B illustrates a flow chart that is used in conjunction with white calibration.

Feeding a white (blank) sheet of paper through the color scanner, exercises all three color signals simultaneously. Because a white sheet of paper has a known and predictable spectral curve, the color gain coefficients can be programmed in such a manner as to allow the scanner to mimic this ideal response. FIGS. 4A and B show a flow chart for implementing white calibration. Step 80 requires microprocessor and RAM storage subsystem 52 (FIG. 2) to set all of the red, green, and blue gain coefficients to a value of 1 and then in step 82 set all of the pixel accumulators (located in memory within microprocessor and RAM storage subsystem 52) to 0. In step 84, an operator feeds a white piece of paper through the color scanner in order to calibrate the response. In step 86 the beginning of the page is detected and the calibration process begins. Color scanner 10 outputs a sequential three color data stream (R,G,B) as it scans each horizontal line of the white document. This information is digitized by A/D converters 32, 34 and 36, one for each color channel. The digitized signals are sent to multipliers 38, 40 and 42 respectively. Because microprocessor 52 had previously set all gains to a value of 1, the output of each multiplier is equivalent to R,G,B values of each pixel. Microprocessor 52 captures this sequential line of grey scale color information in step 88 within its own memory (RAM) and then adds each pixel's red, green, and blue values to the appropriate accumulator in accordance with step 90.

The microprocessor maintains separate accumulators for R,G, and B values for each pixel (total number of accumulators=3 ×number of horizontal pixels). This accumulation process continues until the end of the page is detected in step 92. The total number of lines processed is maintained by a line counter in step 94. Once the scanning of the page has been completed, microprocessor 52 calculates the average red, green, and blue values for each pixel in step 96 by dividing each accumulator value by the line count (number of lines captured). This information corresponds to the average color response for each horizontal pixel.

Once this color response is known, red, green, and blue gain coefficients can be calculated for each pixel in step 98. This is done in order to "normalize" the response, which guarantees that each pixel responds in a similar fashion given a similar input. The gain coefficients are calculated by dividing the average R, G, B response of each pixel into the ideal or optimum R, G, B response. The optimum response is based on the ideal R, G, B values for a "white" input. Once the gain coefficients are calculated, 3 per pixel, and are stored in accordance with step 100 in a dual-ported memory (not shown, but part of the microprocessor and RAM storage subsystem), with microprocessor and RAM storage subsystem 52, thereby completing the white calibration process. Once calibrated, the apparatus (FIG. 2) is capable of compensating for any color or gain anomolies by multiplying each pixel's red, green, and blue video value by an image compensating coefficient. During operation, color scanner 10 outputs red, green, and blue signals for each horizontal pixel sequentially, and each color signal is digitized by A/D converters 32, 34 and 36. The digital grey scale color information for each pixel is then sent to multiplier circuits 38, 40 and 42 respectively. Microprocessor and RAM storage subsystem 52 recalls the unique R,G,B gain coefficients for each pixel in the horizontal scan and simultaneously presents these coefficients to the 3 multipliers, thereby multiplying each pixel's red, green and blue values by their corresponding gain coefficient. The outputs of these multipliers represent the normalized red, green, and blue values for each pixel. By running calibration, storing the unique color gain coefficients for each pixel, and subsequently using the gain coefficients to normalize the R,G,B response for each pixel, the output of color scanner 10 is balanced for a correct and uniform spectral response.

FLOW CHART FOR ZONE CALIBRATION

Figure 4B:
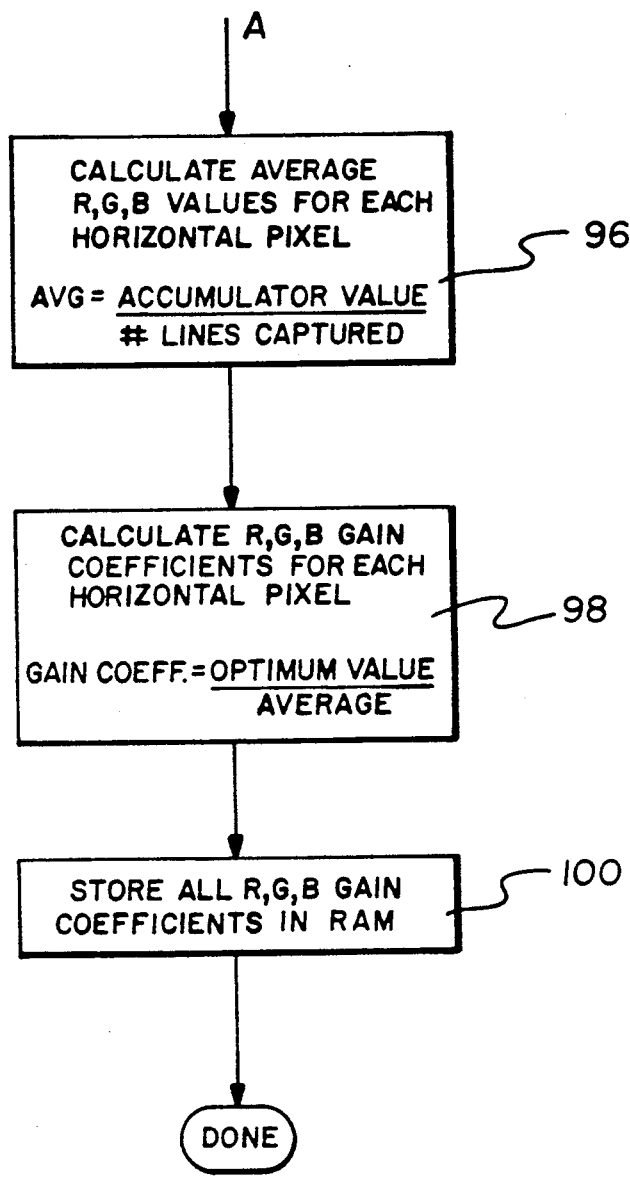
Figure 5A:
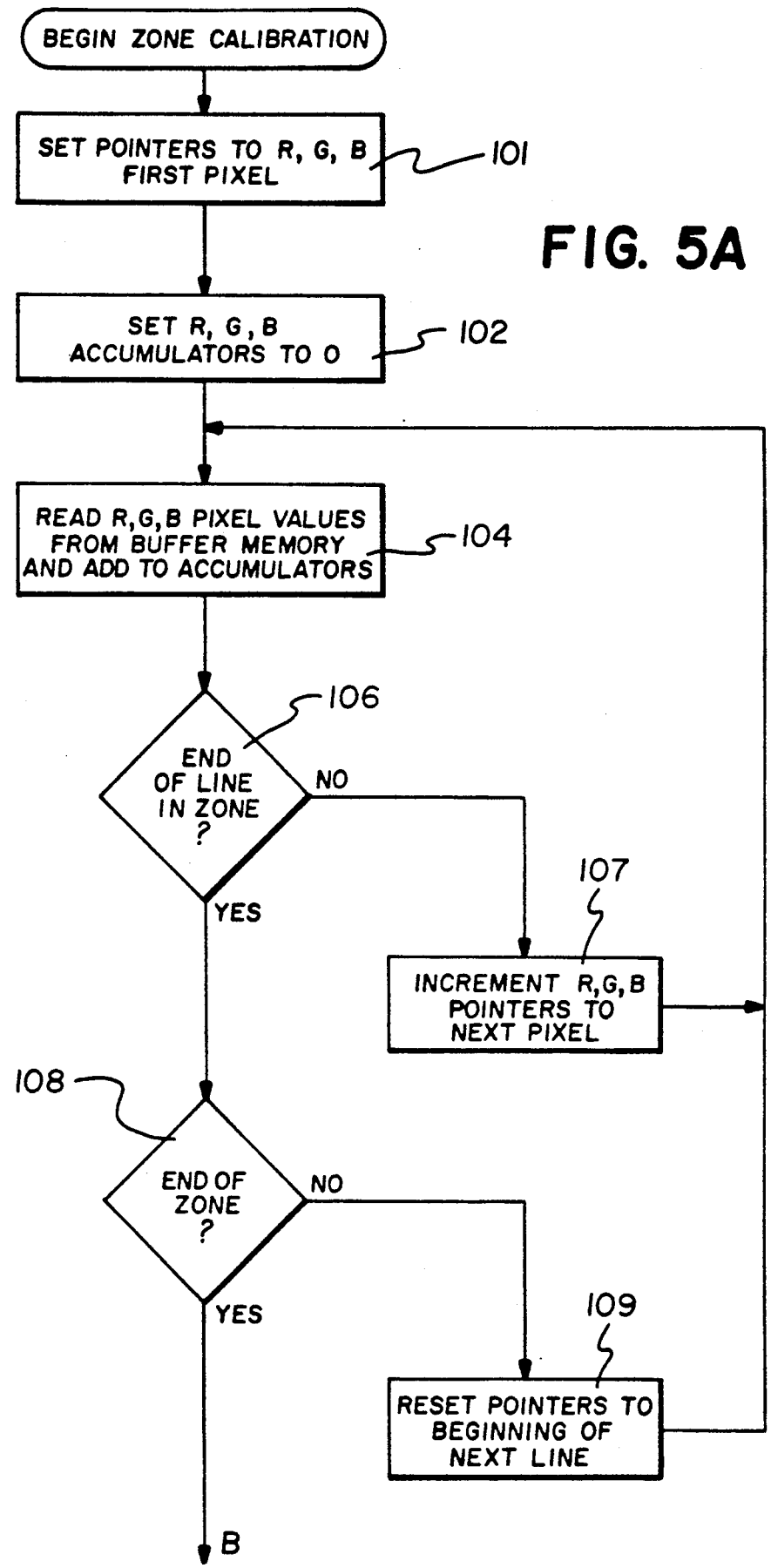

FIG. 4 shows a flow chart for zone calibration. The first step 101 in zone calibration is setting the pointers to the red, green and blue values stored in buffer memory 37 corresponding to the first pixel in the calibration zone. The next step 102 is to initialize the R,G,B accumulators to zero (0). Once initialization is complete, the process of reading the R,G,B values and adding them to the accumulators begins in step 104. This process is done for all pixels within the predetermined calibration zone as determined by the width in step 106. Step 107 increments three values of R,G,B per pixel until the end of the line within the calibration zone is reached. The height is controlled by step 108 and step 109 increments R,G,B pointers to the beginning of the next line in the calibration zone. The output of the processor is stored in three accumulators, one containing the summation of all red values within the zone, one containing the summation of all green values within the zone, and one containing the summation of all blue values within the zone. Once the accumulated values have been stored, the average red, green and blue values can be calculated by dividing each accumulator value by the total number of pixels in the zone (height×width) in accordance with step 110. Once the average color has been determined, as represented by the average red, green and blue values, the three color coefficients can be calculated in accordance with step 112.

When calculating the drop-out coefficients the following equations must be adhered to:

$$(C_R)(D_R)+(C_G)(D_G)+(C_B)(D_B)=1 \quad (1)$$

and $$C_R+C_G+C_B=1 \quad (2)$$

where:

$D_R$ = the normalized red video level for the particular drop-out color $(0<D_R<1)$ $D_G$ = the normalized green video level for the particular drop out color $(0<D_G<1)$ $D_B$ = the normalized blue video level for the particular drop-out color $(0<D_B<1)$ $C_R$ = the calculated red coefficient for the particular drop-out color $(0<C_R<1)$ $C_G$ = the calculated green coefficient for the particular drop-out color $(0<C_G<1)$ $C_B$ = the calculated blue coefficient for the particular drop-out color $(0<C_B<1)$ Equation (1) guarantees that the particular color will drop-out by setting the total video output (red+-green+blue) to the maximum value of 1.

Equation (2), coupled with the range of 0-1 for each coefficient, guarantees that no input color (including a perfect "white", where red=green=blue=1) will cause the output to exceed a value of 1.

The normalized color vectors (DR, DG, DB) are calculated as follows:

$$D_R=R/SQRT(R^2+G^2+B^2)$$

$$D_B=B/SQRT(R^2+G^2+B^2)$$

$$D_G=G/SQRT(R^2+G^2+B^2)$$

where:

R = measured Red response of calibration zone $(0<R<1)$

G = measured Green response of calibration zone ($0 < G < 1$)

B = measured Blue response of calibration zone ($0 < B < 1$)

In order to satisfy equations (1) and (2), and maximize the differential between filled-out text and the drop-out color, the coefficients $C_R$, $C_G$ and $C_B$ are calculated as follows:

$$C_R = D_R/(D_R + D_G + D_B)$$

$$C_G = D_G/(D_R + D_G + D_B)$$

$$C_B = D_B/(D_R + D_G + D_B)$$

Once calculated, these coefficients implement a bandpass filter with characteristics quite similar to an optical filter. The advantage, of course, is the ability to program the exact color to be filtered. For example, a form with red printing (and therefore the same red ink in the calibration zone) may produce an average drop-out color with the values $R = 0.9$, $G = 0.3$ and $B = 0.1$. The corresponding normalized drop-out color vector would be:

$$D_R = 0.9/SQRT(0.9^2 + 0.3^2 + 0.1^2) = 0.94$$

$$D_G = 0.3/SQRT(0.9^2 + 0.3^2 + 0.1^2) = 0.31$$

and $$D_B = 0.1/SQRT(0.9^2 + 0.3^2 + 0.1^2) = 0.10$$

For this normalized drop-out color the 3 color coefficients would be calculated as follows:

$$C_R = 0.94/(0.94 + 0.31 + 0.10) = 0.70$$

$$C_G = 0.31/(0.94 + 0.31 + 0.10) = 0.23$$

$$C_B = 0.10/(0.94 + 0.31 + 0.10) = 0.07$$

After calculating the color coefficients for the particular drop-out color, the microprocessor must calculate new R, G, B coefficients in order to carry out both white balance and drop-out color with one set of coefficients (using a system as shown in FIG. 2). These final coefficients (red coefficient, green coefficient, and blue coefficient) are calculated by multiplying the white calibration coefficients by the drop-out color coefficients:

$$Red\ Coefficient = B_R \times C_R$$

$$Green\ Coefficient = B_G \times C_G$$

$$Blue\ Coefficient = B_B \times C_B$$

where:

$B_R$ = Red coefficient resulting from White Calibration $B_G$ = Green coefficient resulting from White Calibration $B_B$ = Blue coefficient resulting from White Calibration The system shown in FIG. 3 does not require the calculation of common color coefficients, since white balance and drop-out color are handled by separate multipliers.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

Advantages and Industrial Applicability

The present invention is useful for processing business forms in conjunction with optical character recognition systems as a way of separating text information on forms by automatically detecting and selecting a drop-out color. A predetermined zone on the form to be processed contains a sample of the color ink used to print the form. The system first looks at this zone and determines the "average color" of the particular ink and then calculates the proper Red, Green and Blue coefficients to filter this color. Advantageously, once the coefficients are determined and loaded, the form can be processed with the optimum drop-out filter for that particular color.

With use of the zone calibrated electronic filter technique of the present invention, the electronic filter parameters are automatically adjusted based on the form currently being processed. Such a system is able to match any color that may be used on any business form and compensate for variations in the inks used to print different batches of the forms.

Also, different color forms (red and green, for example) may be intermixed within a batch.

What is claimed is:

1. An apparatus for processing a color form having a color calibration zone in a predetermined location, said apparatus comprising:
   means for scanning said form and generating a plurality of different analog grey-scale color signals;
   means for converting said grey-scale color signals into color digital video signals on a pixel by pixel basis;
   means for storing a plurality of scan lines containing said color grey-scale digital information for said calibration zone;
   means for accessing said stored scan lines in said memory to analyze the pixel data in said calibration zone;
   means for analyzing the color grey-scale information for the pixels within said calibration zone so as to calculate the average color value within said calibration zone;
   digital multipliers associated with each color signal and controlled by adjustable coefficients; and
   means for calculating color coefficients of said digital multipliers for each color signal so as to form an electronic filter to filter said average color.

2. An apparatus for processing a plurality of scan lines containing color grey-scale digital information generated by a color scanner after scanning a color form having a calibration zone in a predetermined location, said grey-scale color signals having been converted to a grey-scale digital format on a pixel by pixel basis by an analog to digital converter associated with each color signal;
   memory means for storing a plurality of scan lines containing said color grey-scale digital information;
   means for accessing said stored scan lines in said memory to analyze the pixels in said predetermined calibration zone;

means for analyzing the color grey-scale information for the pixels within said zone so as to calculate the average color value;

digital multipliers associated with each color signal and adjustably controlled by coefficients; and means for calculating color coefficients for said digital multipliers for each color signal so as to form an electronic filter to filter said average color.

3. The apparatus as set forth in claim 2 wherein said average color value is represented as an n-dimensional vector where n is the number of different grey-scale outputs from the color scanner.

4. The apparatus as set forth in claim 2 wherein said memory means takes the form of a dual-ported buffer memory.

5. An apparatus for reading the image information of a colored original having a calibration zone in a predetermined location on said original, said apparatus comprising:

means for scanning a colored original and outputting at least two separate color analog signals for each scan line;

means for converting said analog signals into color digital video signals on a pixel by pixel basis;

means for storing a plurality of scan lines containing said digital video signals on a pixel by pixel basis;

means for accessing said scan lines in said memory in order to analyze pixel data in said calibration zone;

means for analyzing the pixel data of said digital video signals located within the calibration zone so as to calculate the average color thereof; and means for calculating color coefficients for a digital multiplier for each color signal so as to form an electronic filter to filter said average color.

6. An apparatus for processing the image information of a color original having a calibration zone in a predetermined location on said original using a color scanner to generate at least two color signals, said signals being converted to digital color video information by an analog to digital converter associated with each color signal on a pixel by pixel basis, and stored in a memory said apparatus comprising:

memory means for accessing said memory in order to read said stored digital color video information for on a pixel by pixel;

processing means for calculating an average color vector for at least two colors using the pixels in said calibration zone from said stored digital color video information, and said Processing means further calculating the color filter coefficients to filter said average color; and multiplier means for multiplying each digital color video information signal and the respective color filter coefficients for each color signal.

7. A method of processing a color form having a color calibration zone in a predetermined location, said method comprising the steps of:

scanning said form and generating a plurality of different analog grey-scale color signals;

converting said grey-scale color signals into color grey-scale digital information signals on a pixel by pixel basis;

storing a plurality of scan lines containing said color grey-scale digital information signals for said calibration zone;

accessing said stored scan lines to analyze the pixel data in said calibration zone;

analyzing the color grey-scale digital information for the pixels within said calibration zone so as to calculate the average color value in said calibration zone;

adjusting the level of each color signal in accordance with coefficients associated with each signal; and calculating the coefficient for each color signal so as to form an electronic filter to filter said average color.

* * * * *